J. F. FOLLIARD.
BALL BAT.
APPLICATION FILED SEPT. 24, 1917.

1,291,464. Patented Jan. 14, 1919.

WITNESSES:
William Miller
Joshua Bergstrom

INVENTOR.
James F. Folliard
BY
ATTORNEYS

UNITED STATES PATENT OFFICE.

JAMES F. FOLLIARD, OF BROOKLYN, NEW YORK.

BALL-BAT.

1,291,464.  Specification of Letters Patent.  Patented Jan. 14, 1919.

Application filed September 24, 1917. Serial No. 192,914.

*To all whom it may concern:*

Be it known that I, JAMES F. FOLLIARD, a citizen of the United States, residing at Brooklyn, county of Kings, and State of New York, have invented new and useful Improvements in Ball-Bats, of which the following is a specification.

This invention relates to a bat especially adapted for use by children to strike a resilient ball.

The object of the invention is to provide a device having a flat blade and a handle which can readily be manipulated by a child in playing juvenile games with a bouncing lively rubber ball.

The novel features of the invention are more fully described in the following specification and claims and illustrated in the accompanying drawing in which:

Figure 1:
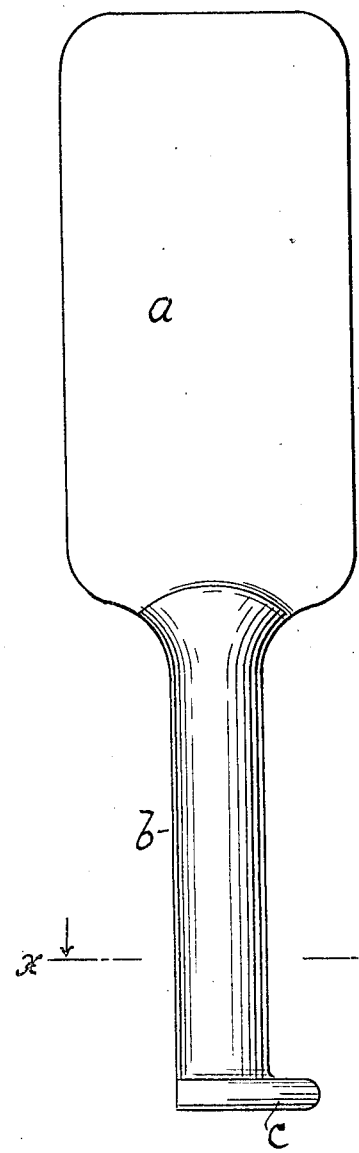
Figure 1 represents a side view of a bat embodying this invention.
Figure 2:
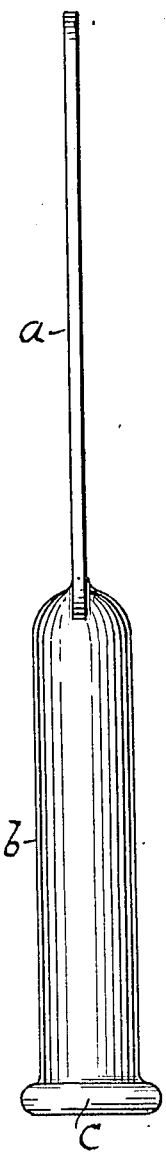
Fig. 2 is an end view of the same.
Figure 3:
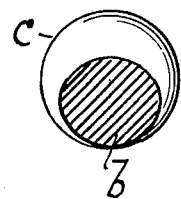
Fig. 3 is a transverse section taken along the line $x$ $x$ of Fig. 1.

In this drawing is shown a bat including a flat blade or paddle $a$ and a handle $b$ forming a contiguous part of the blade. The end of the handle is provided with a rim or stop $c$ forming an eccentric flange with the axis of the handle. The handle is oval shaped transversely as indicated in Fig. 3 so that it can be conveniently grasped. The bat is preferably formed of a single piece of wood and the blade is practically rectangular in form.

As indicated the flange $c$ prevents the hand from slipping off the end of the handle but does not interfere with the swing of the bat. By having the projecting part of the flange on the side of the handle opposite the wrist of the player, it will form a smooth surface on the other side of the handle and prevent the flange from getting tangled with any portion of the clothing.

I claim:—

1. A bat consisting of a flat blade, a handle forming a contiguous portion of the blade, and a flanged eccentric rim located on the end of the handle.

2. A bat consisting of a flat rectangular blade, an oval shaped handle forming a contiguous portion of the blade, and a flanged rim eccentric with the axis of the handle.

In testimony whereof I have hereunto set my hand in the presence of two subscribing witnesses.

JAMES F. FOLLIARD.

Witnesses:
 WILLIAM MILLER,
 GRACE DE VOE.

Copies of this patent may be obtained for five cents each, by addressing the "Commissioner of Patents. Washington, D. C."